United States Patent [19]
Kozak

[11] 3,890,974
[45] June 24, 1975

[54] DISPOSABLE ABSORBENT ARTICLE CONTAINING SLITTED HYDROGEL FILM

[75] Inventor: Theodore F. Kozak, Peekskill, N.Y.

[73] Assignee: Union Carbide Corporation, New York, N.Y.

[22] Filed: June 18, 1974

[21] Appl. No.: 480,523

[52] U.S. Cl.............. 128/287; 128/156; 128/290 R; 128/296
[51] Int. Cl.......................................... A41b 13/02
[58] Field of Search .......... 128/296, 287, 284, 156, 128/286, 287, 290 R, 290 W, 290 P

[56] References Cited
UNITED STATES PATENTS

| | | |
|---|---|---|
| 3,292,619 | 12/1966 | Egler.................................. 128/156 |
| 3,399,672 | 9/1968 | Crowe, Jr. et al.... ............ 128/156 |
| 3,543,750 | 12/1970 | Meizanis............................ 128/156 |
| 3,783,872 | 1/1974 | King.............................. 128/290 R |
| 3,814,101 | 6/1974 | Kozak................................. 128/287 |

Primary Examiner—Aldrich F. Medbery
Attorney, Agent, or Firm—C. J. Vicari

[57] ABSTRACT

Disposable absorbent articles are disclosed which include a topsheet, a liquid impermeable backsheet, and a hydrophilic, substantially water insoluble film disposed between the topsheet and the backsheet. The film contains a plurality of straight slits, of specific length, whereby liquid contacting the film causes the film to swell and to thereby open said slits to permit passage of the liquid therethrough.

11 Claims, 3 Drawing Figures

3,890,974

DISPOSABLE ABSORBENT ARTICLE CONTAINING SLITTED HYDROGEL FILM

The invention relates to disposable absorbent articles such as diapers, incontinency pads, and the like.

The use of disposable absorbent articles such as diapers has increased considerably in recent years owing to their ease of use, low cost, and the advantage of having a clean, fresh, absorbent article without the inconvenience of having to wash, store, fold and re-use a previously used non-diposable article. The advantages of using disposable absorbent articles are particularly apparent in the wide acceptance of disposable diapers as a replacement for the cloth diapers which have traditionally been used.

The invention will be described in detail with reference to a disposable diaper, but the teachings herein are applicable to other disposable absorbent articles such as incontinency pads and the like.

Disposable diapers known to the art generally include a liquid absorbing layer, a liquid impermeable backsheet, and a hydrophobic liquid permeable body contacting topsheet. The liquid absorbent layer is generally an absorbent material having a high degree of absorption properties. The absorbent materials can be tissue paper or wadding stacked to the desired thickness, or wood pulp products such as wood fluff. It has been proposed, for example in Belgian Pat. No. 752,366, to employ as the liquid absorbent material a film of an insoluble hydrogel. A hydrogel is a hydrophilic, water-insoluble polymer such as irradiated polyethylene oxide, polyvinyl pyrrolidone, polyacrylic acid, and the like. Such hydrogel films are particularly interesting for use in disposable absorbent articles because, as mentioned previously, they are capable of absorbing a very large amount of aqueous liquid. However, the rate, as contrasted to the quantity of liquid absorbed by such hydrogel film is, relative low. As a result, when, for instance a baby wets, the hydrogel film does not absorb the urine fast enough to prevent pools of urine from forming, which can cause leakage around the edges of the diaper, as well as causing the baby to be uncomfortable because of the wetness next to the skin.

In order to prevent such pool of urine from forming when a hydrogel film is employed as the absorbent material in a disposable diaper, I tried providing pinhole openings in the film which would permit the passage of urine to the side of the film away from the baby, to thereby keep the moisture away from the baby's skin until the hydrogel film has had a chance to absorb it. However, when pinholes were employed as the openings in the film, it was found that as soon as the film absorbed moisture, the pinholes swelled shut and no longer permitted passage of liquid to the backside of the film. I then attempted to employ relatively long slits, for instance, ½ inch slits, in the film for this purpose. Unfortunately, however, when the film absorbed moisture the slits did in fact open up to permit passage of liquid therethrough, but the slits opened to such wide openings that the liquid flowed right back from the other side to the front again. This occurred even though an auxiliary layer of hydrophilic absorbent material was placed on the side of the film adjacent to the backsheet.

It has been discovered that the foregoing disadvantages in the use of hydrogel film in a disposable article such as a diaper can be significantly and substantially alleviated by employing a hydrogel film having straight slits of controlled length. The slits that are employed in the hydrogel film are of a magnitude such that when the film absorbs liquid, the slits form openings which permit passage of urine from the body contacting side of the diaper to the other side of the film. Thus, pools of liquid (urine) on the side of the film facing the baby's skin are avoided. When the film is saturated, these slits tend to close thereby reducing the flow of liquid back through the film to the side facing the baby's skin. Optimum results are obtained when a secondary absorbent layer is employed on the side of the hydrogel film adjacent to the impermeable backsheet.

It is therefore an object of the present invention to provide an absorbent article containing a hydrogel liquid absorbing sheet material with controlled length slitted openings and having a high degree of absorption properties.

Another object is to provide a disposable diaper having a hydrogel film as the liquid absorbing material and which has been treated so as to permit some liquid to pass through said hydrogel film during periods of excessive flooding.

These and other objects will become apparent from the following description of the invention taken in conjunction with the accompanying drawings in which.

In its broadest aspect the invention provides a disposable absorbent article for placement adjacent to the body, including:

a. a hydrophobic liquid permeable topsheet for placement adjacent to the body;

b. a liquid impermeable backsheet; and c. a hydrophilic, substantially water insoluble film disposed between the topsheet and the backsheet. The film contains a plurality of short slits, i.e., 1/16 to ⅜ inch in length, so that aqueous liquid contacting the film causes the film to swell and to thereby open the slits to permit passage of liquid therethrough.

In a more specific aspect the invention provides a disposable diaper including:

a. a hydrophobic liquid permeable topsheet for placement adjacent to the body;

b. a liquid impermeable backsheet;

c. a hydrophobic, substantially water insoluble film containing a plurality of slits of from 2/16 to 5/16 inch in length disposed between the topsheet and the backsheet; and d. an absorbent pad disposed between said backsheet and said hydrophobic film.

In a preferred embodiment, two absorbent pads are utilized, one on each side of the hydrogel material.

Figure 1:
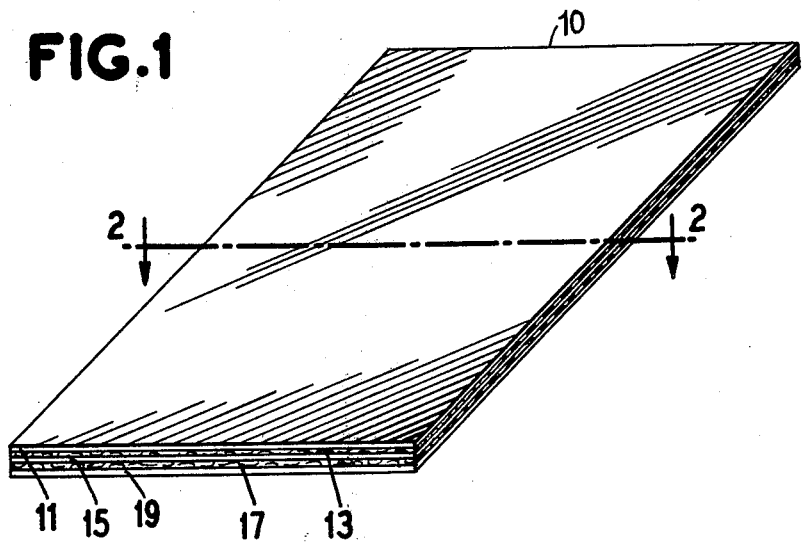
FIG. 1 is a perspective view of a disposable diaper constructed in accordance with the principles of the invention.
Figure 2:
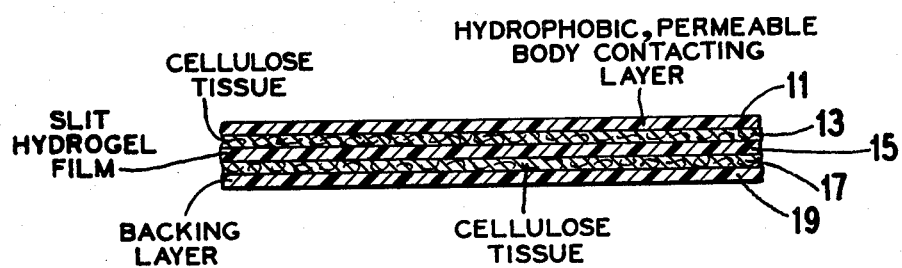
FIG. 2 is a sectional view taken along line 2—2 of FIG. 1.

Referring to FIGS. 1 and 2 of the drawing which depicts the absorbent article as a disposable diaper, it will be seen that the diaper 10 includes a hydrophobic, liquid permeable body contacting topsheet 11, a slitted hydrogel film 15, and a hydrophobic, liquid impermeable backsheet 19. Also, in a preferred aspect of the invention, the diaper contains secondary absorbing layers 13 and 17, containing a liquid absorbing material.

The topsheet layer of the disposable diaper of the invention is a hydrophobic, liquid permeable layer. The topsheet can be, for instance, an open celled foam layer, a loosely woven or a loosely packed non-woven fibrous layer, a gauze, or a slitted hydrophobic film, particularly an ethylene-ethyl acrylate copolymer film, such as disclosed in copending application "Disposable Absorbent Articles" by Theodore F. Kozak, Ser. No. 312,131 filed on Dec. 4, 1974, now U.S. Pat. No. 3,814,101, and assigned to the same assignee as this application.

The topsheet should be thin, flexible, self-supporting, liquid permeable or treated to make it selectively liquid permeable.

The backsheet 19, is a liquid impermeable layer or sheet and is preferably an olefinic or vinyl film. Polyethylene of a thickness of from about 0.4 to about 1.5 mils is most preferred. This type of film has previously been used extensively for this purpose and commonly has had an embossed design in its surface to simulate the appearance and hand of cloth.

As depicted in FIG. 2, the disposable diaper 10 includes a hydrogel film 15 between the topsheet layer and the backsheet layer. The film is of the type that is known to the art, and is somtimes referred to as a "hydrogel." Such hydrogels include polyvinyl pyrrolidone, irradiated polyalkylene oxide, polyacrylic acid, and mixtures thereof. The preferred hydrogel film is composed of irradiated polyethylene oxide, polyacrylic acid, and mixtures thereof. The preferred hydrogel film is composed of irradiated polyethylene oxide such as is disclosed in U.S. Pat. No. 3,264,202. Such irradiated polyethylene oxide is produced by subjecting an aqueous solution of an ethylene oxide polymer having a molecular weight of greater than about 100,000 and up to, for example, about 10,000,000, to ionizing radiation for a period of time and under such conditions to form a substantially water insoluble hydrophilic polymer. For use in the present invention, the hydrogel is preferably produced in a film thickness of from about 0.5 to about 2.0 mils.

Figure 3:
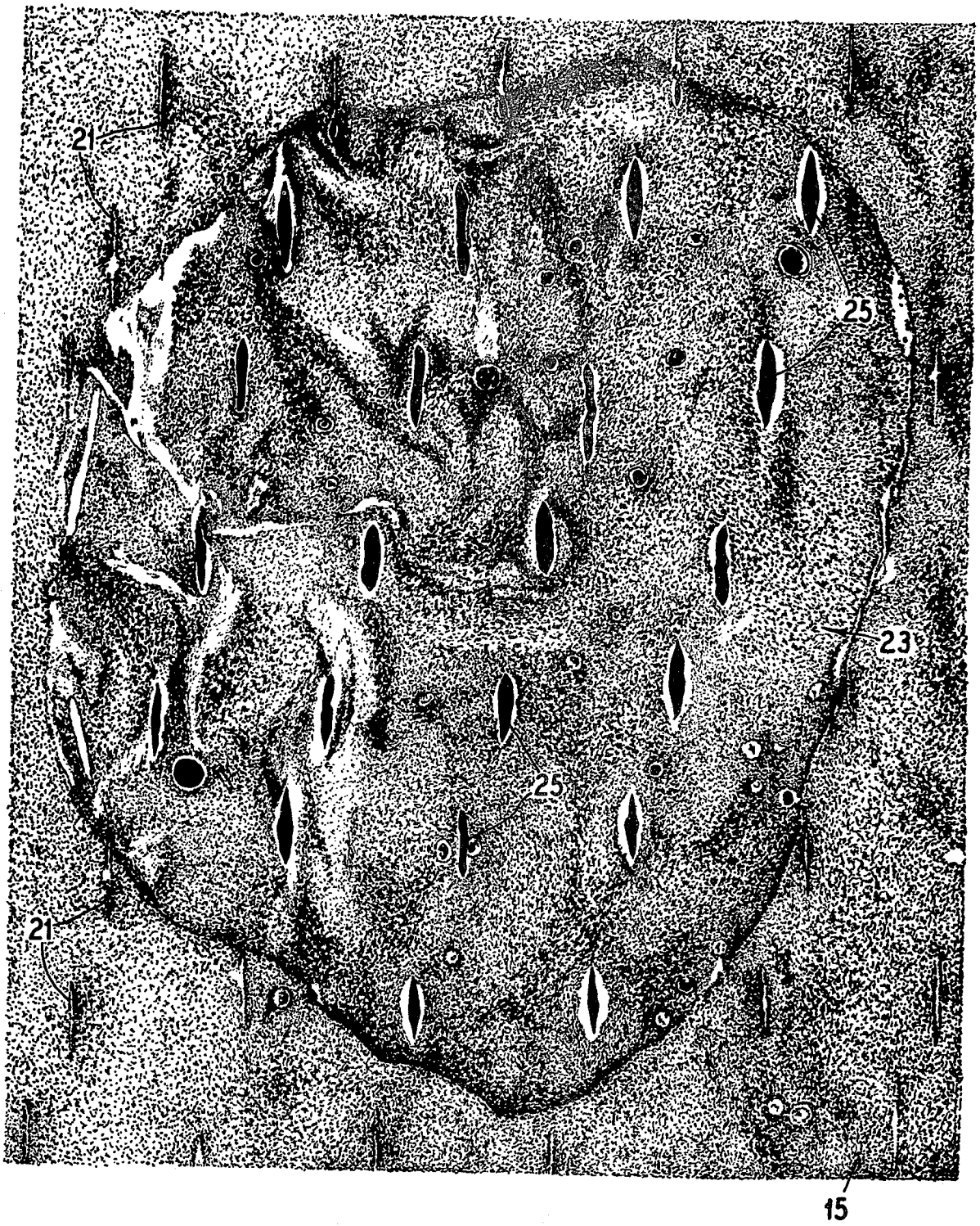
FIG. 3 is a top view of a slitted hydrogel film suitable for use in the invention, wherein part of the film has been wetted to illustrate the opening up of the slits that occurs when the film absorbs moisture.

As will be seen in FIG. 3, the hydrogel film contains a plurality of short slits. When the film absorbs moisture, the slits open up to eye-shaped openings. These openings permit aqueous liquid such as urine to readily pass through the film, from the side facing the topsheet to the other side facing the backsheet. During periods of excessive flooding localized pools of urine would normally build up on the side of the film facing the topsheet if no slits were present due to poor rate of absorption of the film. However, by providing controlled slit lengths, the slits prevent the liquid from passing back through the slits from the side facing the backsheet to the side facing the topsheet. In order to accomplish this purpose, the length of the slits must be carefully controlled. It has been found, for example, that slits having a length of from about 1/16 to about ⅜ inch, and preferably from about 2/16 to about 5/16 inch, are highly desirable for accomplishing this purpose. In general, the hydrogel film contains from about 2 to about 24 slits per square inch of film area, and preferably from about 4 to about 10 slits per square inch. The slits can be formed in the film by any convenient means such as by piercing with a sharp edge.

The preferred method for forming the slits in the hydrogel film according to the present invention is described in U.S. Pat. No. 3,762,255 issued on Oct. 2, 1973 and entitled "Method and Apparatus for Piercing Thin Sheet Material." Briefly, there is disclosed therein a method and apparatus for piercing thin sheet material, such as plastic film, wherein the sheet material is passed between a piercing member having a plurality of independently resilient protrusions extending therefrom and a backing member having a retiform exterior surface. The piercing member or backup member is moved relative to the other member, thereby causing the resilient protrusions to follow the retiform surface and selectively pierce the film. The piercing member can be a metal comb, a wire brush or a metal strip having a plurality of substantially parallel slits extending from one edge thereof in the direction of the opposite edge defining the resilient protrusions. The backing member can be a wire screen, a perforated metal sheet, an engraved metal roll or an endless belt which is driven longitudinally with respect to the piercing member.

As mentioned previously, the slits of controlled length in the hydrogel film open when wet to permit excess liquid to flow through the film to the backsheet. This is best illustrated in FIG. 3 which is a top view of a slitted hydrogel film suitable for use in the disposable diapers of the invention. Thus referring again to FIG. 3, it will be seen that the film 15 contains a plurality of slits 21. The film has been wetted in an area generally designated as 23. It is noted that the slits 21 in the wetted area 23 have opened to eye-shaped openings. It is especially interesting to note that where a slit 21 crosses the interface from the dry area of the film 15 to the wet area 23, that the portion of the slit 21 in the dry area remains closed, whereas the portion of the slit in the wetted area has opened to an eye-shaped opening 25.

In a preferred embodiment of the invention, the disposable diaper of the invention may optionally have additional moisture absorbing layers. For instance, a relatively thin moisture absorbing layer composed of, for example, cellulose tissue, or the like, can be interposed between the topsheet and the hydrogel film. Another layer of moisture absorbing material can be interposed between the backsheet and the hydrogel film. The purpose of the two secondary absorbing layers, and particularly the absorbing layer that is interposed between the backsheet and the hydrogel film, is to temporarily absorb moisture that passes through the slits in the hydrogel film until the hydrogel film has had an opportunity to absorb the moisture.

Absorbent materials other than cellulose tissue will, of course, be useful in the construction of the present invention. For example, absorbent non-woven pads can be fabricated to any desired thickness and substituted for the cellulose tissue layer described above. One such absorbent layer or pad which has been used extensively in disposable diapers is a wood pulp product commonly known as wood fluff and is prepared in the same manner as a non-woven fabric. Thus such type absorbent pad is also useful as the absorbent pads of the inserts of the present invention.

Various natural and synthetic polymeric materials are themselves absorbent or can be made absorbent and will therefore be useful as, or in combination with, the absorbent layer of the present invention.

The only criteria for utility in the present invention are that the material constituting the absorbent layers be absorbent, be capable of being fabricated in the form of a pad, be compatible with the waste products with which it will come in contact and be non-irritating to the skin.

The fabrication of the diaper may be accomplished by a variety of techniques. In a preferred technique, the topsheet and backsheet are cut to approximately the same dimensions which are equal to the desired size of the final diaper.

The topsheet and backsheet are then juxtaposed one on the other with the hydrogel film sandwiched therebetween in approximately the center of the sheets. The hydrogel film should be of a length and width slightly smaller than the topsheet and backsheet to permit sealing of the topsheet to the backsheet around their periphery. An overhang of about one-half inch on each side should be sufficient. In addition, the hydrogel film is slitted according to the previously explained procedure prior to fabrication to the diaper. Sealing can conveniently be accomplished such as by the use of an adhesive or if both sheets are thermoplastic, then by heat sealing the edges.

In the case where one or more absorbent pads are utilized in conjunction with the hydrogel film, then the pads may be superimposed on the hydrogel film and assembled into the diaper as explained previously.

What is claimed is:

1. A disposable absorbent article for placement adjacent to the body, including:
   a. a hydrophobic liquid permeable topsheet for placement adjacent to the body;
   b. a liquid impermeable backsheet; and
   c. a hydrophilic, substantially water insoluble film disposed between said topsheet and said backsheet, said film containing a plurality of slits of from about 1/6 to ⅜ inch in length, whereby liquid contacting said film causes the film to swell thereby opening said slits to permit passage of liquid therethrough.

2. The disposable, absorbent article of claim 1 wherein said hydrophilic, substantially water insoluble film is selected from the group consisting of irradiated polyalkylene oxide, polyvinyl pyrrolidone, polyacrylic acid, and mixtures thereof.

3. The disposable, absorbent article of claim 2 wherein said hydrophilic, substantially water insoluble film is irradiated polyethylene oxide.

4. The disposable, absorbent article of claim 3 wherein said article includes a layer of hydrophilic, absorbent material intermediate said film and said backsheet.

5. The disposable, absorbent article of claim 3 wherein said article includes a layer of hydrophilic, absorbent material on each side of said film.

6. A disposable diaper comprising in combination, the hydrophobic topsheet, the substantially liquid impermeable backsheet, and the hydrophilic substantially water insoluble film as defined in claim 1 wherein the topsheet and backsheet are of substantially the same dimension and being at least partially adhered to each other around their periphery to form an integrated diaper structure having said film substantially enclosed and sandwiched between the topsheet and the backsheet.

7. A disposable diaper as claimed in claim 6 wherein said hydrophilic, substantially water insoluble film is selected from the group consisting of irradiated polyalkylene oxide, polyvinyl pyrrolidone, polyacrylic acid, and mixtures thereof.

8. A disposable diaper as claimed in claim 7 wherein said hydrophilic, substantially water insoluble film is irradiated polyethylene oxide.

9. A disposable diaper as claimed in claim 8 wherein said diaper includes a layer of hydrophilic, absorbent material intermediate said film and said backsheet.

10. A disposable diaper as claimed in claim 6 wherein said film contains a plurality of slits of from 2/16 to 5/16 inch in length.

11. A disposable diaper as claimed in claim 6 wherein said film contains from 2 to about 24 slits per square inch of film area.

* * * * *